(12) United States Patent  (10) Patent No.: US 9,320,121 B2
Sun et al.  (45) Date of Patent: Apr. 19, 2016

(54) LED LIGHTING APPARATUS, CONTROL SYSTEM, AND CONFIGURATION METHOD

(71) Applicant: ZHEJIANG SHENGHUI LIGHTING CO., LTD, Jiaxing (CN)

(72) Inventors: Chaoqun Sun, Jiaxing (CN); Xia Wang, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 14/488,479

(22) Filed: Sep. 17, 2014

(65) Prior Publication Data
US 2015/0002047 A1 Jan. 1, 2015

Related U.S. Application Data

(63) Continuation of application No. PCT/CN2014/079917, filed on Jun. 16, 2014.

(30) Foreign Application Priority Data

Jun. 20, 2013 (CN) .......................... 2013 1 02498500

(51) Int. Cl.
H05B 37/00 (2006.01)
H05B 37/02 (2006.01)
H04L 12/64 (2006.01)

(52) U.S. Cl.
CPC ........ *H05B 37/0272* (2013.01); *H04L 12/6418* (2013.01)

(58) Field of Classification Search
CPC . H05B 37/00; H05B 37/0272; H05B 33/0842
USPC .......................... 315/112, 291, 292, 294, 307
See application file for complete search history.

(56) References Cited

U.S. PATENT DOCUMENTS 8,344,655 B2 * 1/2013 Luk .................... H05B 33/0857
315/294
2013/0271004 A1 * 10/2013 Min et al. ...................... 315/112

* cited by examiner

*Primary Examiner* — Jimmy Vu
(74) *Attorney, Agent, or Firm* — Anova Law Group, PLLC

(57) ABSTRACT

Apparatus and control systems for LED lighting, and methods for configuring the control systems are provided. An LED lighting apparatus includes: a primary LED lighting device containing a WiFi module and a Zigbee module; and at least one secondary LED lighting device containing a Zigbee module. An LED lighting control system includes an LED lighting apparatus, a WiFi router, and a smart terminal. A Zigbee network is formed by Zigbee modules included in the primary/secondary LED lighting devices. The WiFi module of the primary LED lighting device is connected to internet via the WiFi router. The smart terminal is configured to directly control lighting of the at least one secondary LED lighting device via the primary LED lighting device.

19 Claims, 3 Drawing Sheets

LED LIGHTING APPARATUS, CONTROL SYSTEM, AND CONFIGURATION METHOD

CROSS-REFERENCES TO RELATED APPLICATIONS

This application is a continuation application of PCT Patent Application No. PCT/CN2014/079917, filed on Jun. 16, 2014, which claims priority to Chinese Patent Application No. 201310249850.0, filed on Jun. 20, 2013, the entire content of which is incorporated herein by reference.

FIELD OF THE DISCLOSURE

The present disclosure generally relates to the field of LED (i.e., light emitting diode) lighting technology and, more particularly, relates to apparatus, control systems, and methods for LED lighting.

BACKGROUND

LED lighting may generally provide advantages in energy conservation, environmental protection, controllable lighting, solid state lighting, and long operational lifetime. LED lighting devices thus have been widely used in various areas for public, commercial, and indoor lighting.

A Zigbee module is a module with a specification for a suite of high level communication protocols used to create personal area networks built from small, low-power digital radios. A Zigbee module often consumes low power with low cost, and is easy to form a network based on network nodes with simple node configurations. The Zigbee module is therefore suitable for remote controls with a low data transmission rate, including those for lighting switches and remote dimming controls.

A conventional home lighting control system may include a lighting lamp and a remote control to centrally control the lighting. The remote control includes a mobile phone, a home gateway, and a wireless coordinator. The home gateway includes a WiFi module and a Zigbee module. A holder of the lighting lamp includes a Zigbee module. The mobile phone is connected to the WiFi module of the home gateway. The Zigbee module of the home gateway is connected with the wireless coordinator. The wireless coordinator is connected with the Zigbee module of the lighting lamp. Instruction signals from the mobile phone can be transmitted sequentially via: the WiFi module of the home gateway, the Zigbee module of the home gateway, and the wireless coordinator of the remote control; and then arrive at the Zigbee module in the holder of the lighting lamp for lighting controls.

The mobile phone, however, does not include any Zigbee module and therefore cannot use application software to directly control the lighting. In addition, because the Zigbee module does not have any IP address and cannot access a network, the conventional lighting system must have a home gateway for accessing a network such as a LAN or internet. This requires additional components and ultimately increases cost.

Thus, there is a need to overcome these and other problems of the prior art and to provide apparatus, control systems, and configuration methods for LED lighting.

BRIEF SUMMARY OF THE DISCLOSURE

One aspect or embodiment of the present disclosure includes an LED lighting apparatus. The LED lighting apparatus includes a primary LED lighting device and at least one secondary LED lighting device. The primary LED lighting device includes a WiFi module and a Zigbee module. The at least one secondary LED lighting device includes a Zigbee module. The primary LED lighting device and the at least one secondary LED lighting device are wirelessly connected by the Zigbee modules from each of the primary LED lighting device and the at least one secondary LED lighting device.

The WiFi module communicates with the Zigbee module in the primary LED lighting device via a communication interface. The communication interface includes at least one of an I2C (inter-integrated circuit) interface, a UART (universal asynchronous receiver/transmitter) interface, an SPI (system packet interface) interface, and a USB (universal serial bus) interface.

The primary LED lighting device further includes a power supply module, and a light emitting module connected to the power supply module to provide lighting of the primary LED lighting device.

The at least one secondary LED lighting device further includes a power supply module, and a light emitting module connected to the power supply module to provide lighting of the at least one secondary LED lighting device.

The LED lighting apparatus further includes a Zigbee network formed by the Zigbee modules from each of the primary LED lighting device and the at least one secondary LED lighting device.

Another aspect or embodiment of the present disclosure includes an LED lighting control system. The LED lighting control system includes a primary LED lighting device, at least one secondary LED lighting device, a WiFi router, and a smart terminal. The primary LED lighting device includes a WiFi module and a Zigbee module. The WiFi module is wirelessly connected to the WiFi router for the primary LED lighting device to access internet. The at least one secondary LED lighting device includes a Zigbee module. The Zigbee modules from each of the primary LED lighting device and the at least one secondary LED lighting device form a Zigbee network and the Zigbee modules in the Zigbee network are wirelessly connected. The smart terminal is configured to control lighting of the at least one secondary LED lighting device via the primary LED lighting device.

The smart terminal is configured to send control instructions to the primary LED lighting device via the WiFi router, and the control instructions are further transmitted from the primary LED lighting device to each of the at least one secondary LED lighting device in the Zigbee network to control the lighting thereof.

Alternatively, the smart terminal is directly connected to the WiFi module of the primary LED lighting device to send control instructions to each of the at least one secondary LED lighting device in the Zigbee network to control the lighting thereof.

The smart terminal is configured to send control instructions including a switching instruction, a luminance control instruction, and a combination thereof.

The WiFi module communicates with the Zigbee module in the primary LED lighting device via a communication interface. The communication interface includes at least one of an I2C (inter-integrated circuit) interface, a UART (universal asynchronous receiver/transmitter) interface, an SPI (system packet interface) interface, and a USB (universal serial bus) interface.

The primary LED lighting device further includes a power supply module, and a light emitting module connected to the power supply module to provide lighting of the primary LED lighting device.

The at least one secondary LED lighting device further includes a power supply module, and a light emitting module connected to the power supply module to provide lighting of the at least one secondary LED lighting device.

The smart terminal includes one of a mobile phone, a tablet PC, a desktop computer, and a notebook. Optionally, the smart terminal includes a server including a cloud server.

Another aspect or embodiment of the present disclosure includes a method for configuring an LED lighting control system. A primary LED lighting device each including a WiFi module and a Zigbee module is configured. The WiFi module is wirelessly connected to a WiFi router for the primary LED lighting device to access internet. At least one secondary LED lighting device including a Zigbee module is configured. The Zigbee modules from each of the primary LED lighting device and the at least one secondary LED lighting device form a Zigbee network, and the Zigbee modules in the Zigbee network are wirelessly connected. A smart terminal is configured to control lighting of the at least one secondary LED lighting device via the primary LED lighting device.

The smart terminal is configured to send control instructions to the primary LED lighting device via the WiFi router, and wherein the control instructions are further transmitted from the primary LED lighting device to each of the at least one secondary LED lighting device in the Zigbee network to control the lighting thereof.

Alternatively, the smart terminal is directly connected to the WiFi module of the primary LED lighting device to send control instructions to each of the at least one secondary LED lighting device in the Zigbee network to control the lighting thereof.

The smart terminal is configured to send control instructions including a switching instruction, a luminance control instruction, and a combination thereof.

The WiFi module communicates with the Zigbee module in the primary LED lighting device via a communication interface. The communication interface includes at least one of an I2C (inter-integrated circuit) interface, a UART (universal asynchronous receiver/transmitter) interface, an SPI (system packet interface) interface, and a USB (universal serial bus) interface.

The smart terminal includes one of a mobile phone, a tablet PC, a desktop computer, a notebook, and a cloud server.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Apparatus, control systems, and methods for LED lighting are provided. The disclosed LED lighting apparatus and LED lighting control systems are provided with low cost, simple configurations, and convenient networking between devices therein. An exemplary LED lighting control system can include one or more LED lighting apparatus. An exemplary LED lighting apparatus can further include a primary LED lighting device and at least one secondary LED lighting device.

Figure 1:
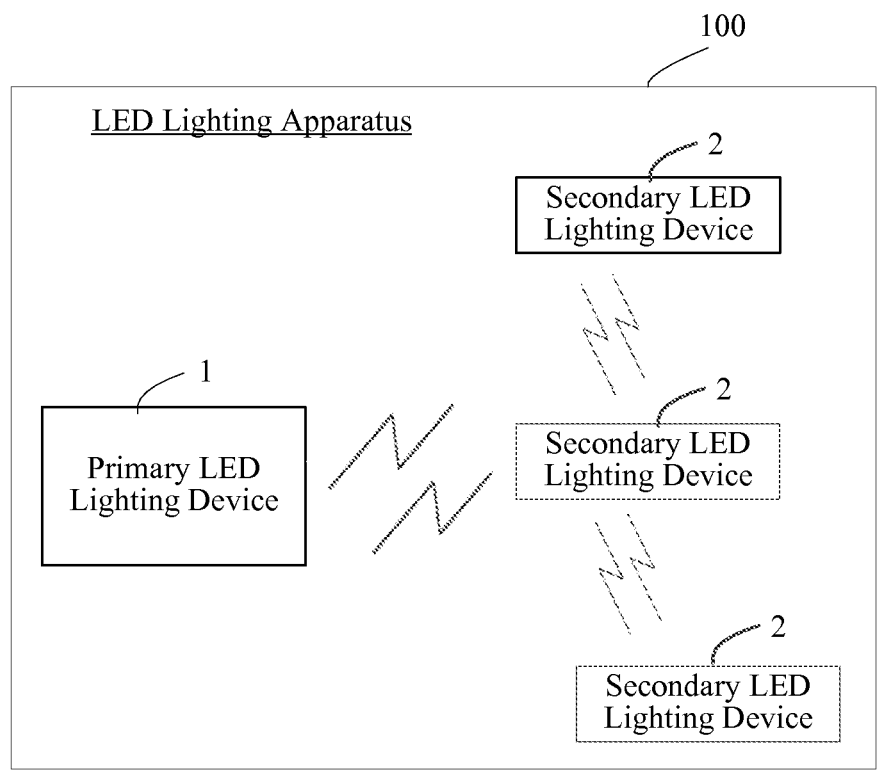
FIG. 1 depicts an exemplary LED lighting apparatus including a primary LED lighting device and secondary LED lighting device(s) consistent with various disclosed embodiments.

FIG. 1 depicts an exemplary LED lighting apparatus 100 consistent with various disclosed embodiments. For illustration purposes, the exemplary device 100 shown in FIG. 1 includes a primary LED lighting device 1 and three secondary LED lighting devices 2, although more or less number of the secondary LED lighting devices 2 can be included for the disclosed LED lighting device.

In one embodiment, each of the primary LED lighting device 1 and the secondary LED lighting devices 2 can be an LED lamp device (e.g., having one or more LED bulbs). Each of the primary LED lighting device 1 and the secondary LED lighting devices 2 can include, for example, a power supply module and a light emitting module connected to the corresponding power supply module. The power supply module can supply power to corresponding primary or secondary LED lighting device(s).

Figure 2A:
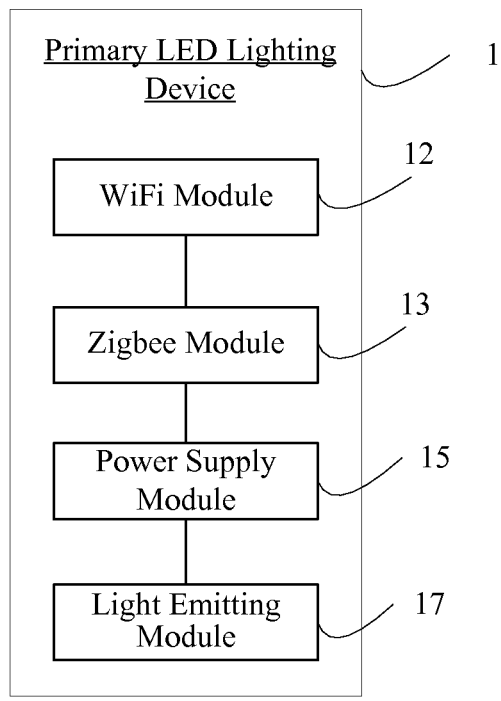
FIG. 2A depicts an exemplary primary LED lighting device consistent with various disclosed embodiments.
Figure 2B:
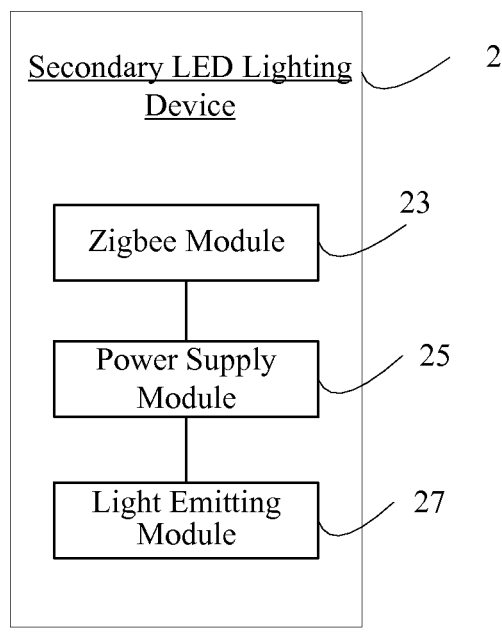
FIG. 2B depicts an exemplary secondary LED lighting device consistent with various disclosed embodiments.

Specifically, FIG. 2A depicts an exemplary primary LED lighting device 1, and FIG. 2B depicts an exemplary secondary LED lighting device 2 consistent with various disclosed embodiments.

In FIG. 2A, the primary LED lighting device 1 can include, for example, a WiFi module 12, a Zigbee module 13, a power supply module 15, and/or a light emitting module 17. The light emitting module 17 can be connected to the power supply module 15 to provide lighting. The power supply module 15 can supply power to the entire primary LED lighting device 1. In various embodiments, one or more of the WiFi module 12, the Zigbee module 13, the power supply module 15, and the light emitting module 17 can be built within a same primary LED lighting device 1.

The primary LED lighting device 1 can include a communication interface between the WiFi module 12 and the Zigbee module 13. Such communication interface can include at least one of an I2C (i.e., inter-integrated circuit), UART (i.e., universal asynchronous receiver/transmitter), SPI (i.e., system packet interface), and/or USB (i.e., universal serial bus) interface.

In FIG. 2B, the secondary LED lighting device 2 can include, for example, a Zigbee module 23, a power supply module 25, and/or a light emitting module 27. The light emitting module 27 can be connected to the power supply module 25 to provide lighting. The power supply module 25 can supply power to the entire secondary LED lighting device 2. One or more of these components can be built within a same secondary LED lighting device 2. In a certain embodiment, the secondary LED lighting device 2 does not include a WiFi module but only includes a Zigbee module.

Figure 3:
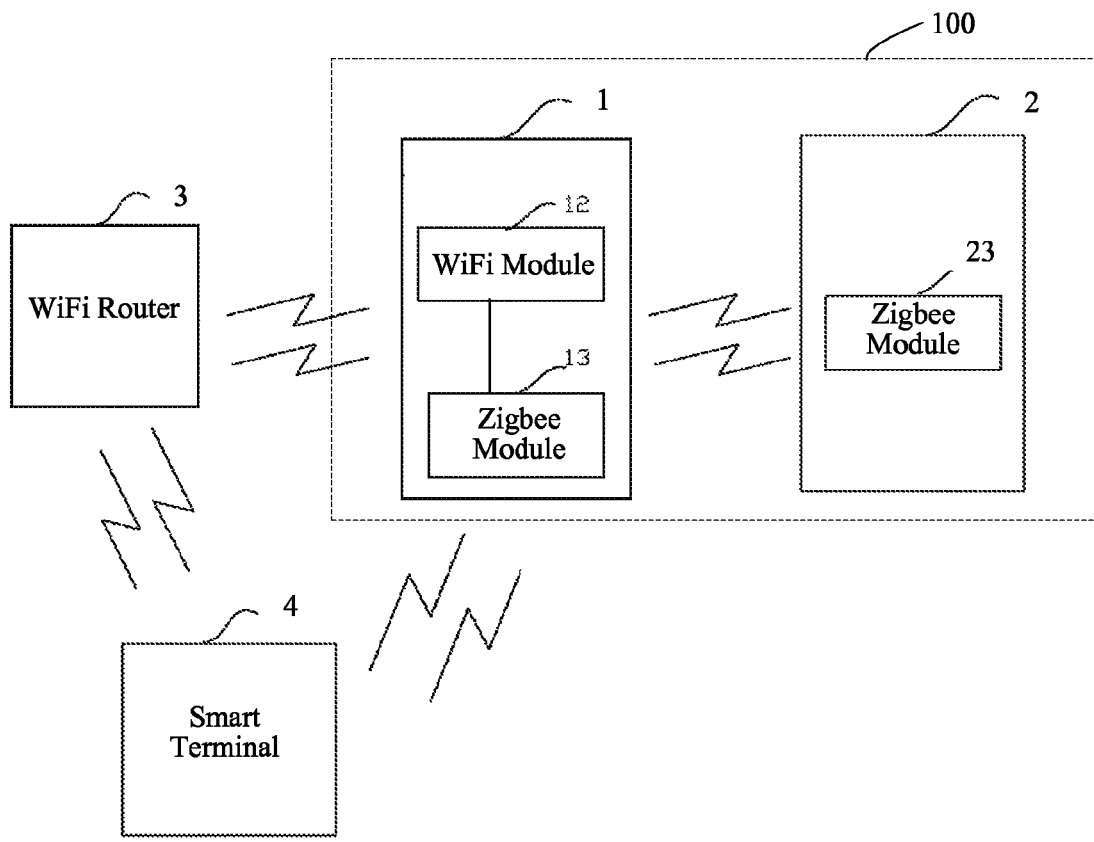
FIG. 3 depicts an exemplary LED lighting control system consistent with various disclosed embodiments.

FIG. 3 depicts an exemplary LED lighting control system 300 consistent with various disclosed embodiments. As shown in FIG. 3, the exemplary LED lighting control system 300 can include, e.g., an LED lighting device 100 including a primary LED lighting device 1 and at least one secondary LED lighting device 2, a WiFi router 3, and/or a smart terminal 4.

The WiFi router 3 can be used to access Internet. The primary LED lighting device 1 can be wirelessly connected to the WiFi router 3 via the WiFi module 12 in the primary LED lighting device 1 to access internet or any other suitable network.

In various embodiments, a Zigbee network can be formed by all Zigbee modules configured in the LED lighting apparatus/control system. For example, a Zigbee network can include the Zigbee module 13 in the primary LED lighting device 1 and the Zigbee module 23 in the secondary LED lighting device 2, as shown in FIG. 3.

The smart terminal 4 can send control instructions to the primary LED lighting device 1 via the WiFi router 3. The control instructions can then be transmitted from the primary LED lighting device 1 to other LED lighting device(s) (e.g., including each secondary LED lighting device 2 and/or other possible LED lighting devices) in the Zigbee network to thus control their lighting.

In some embodiments, the smart terminal 4 can be directly connected to the WiFi module 12 in the primary LED lighting device 1 without using a WiFi router. The control instructions can then be sent to each of other LED lighting devices in the Zigbee network from the primary LED lighting device 1.

The control instructions can include, e.g., a switching instruction, a luminance control instruction, and/or any other suitable instructions for lighting controls of the LED lighting devices in the LED lighting control system. The smart terminal 4 can be, e.g., a mobile phone, a tablet PC, a desktop computer, and/or a notebook. In some embodiments, the smart terminal 4 can be a server such as a cloud server.

Figure 4:
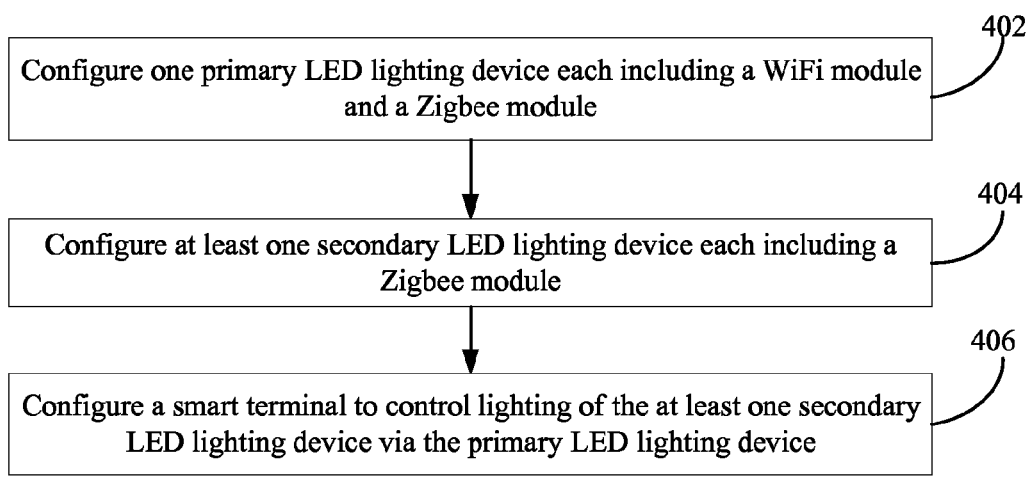
FIG. 4 depicts an exemplary method for configuring an LED lighting control system consistent with various disclosed embodiments.

FIG. 4 depicts an exemplary method for configuring an LED lighting control system consistent with various disclosed embodiments.

In Step 402, a primary LED lighting device is configured to each include a WiFi module and a Zigbee module. The WiFi module is wirelessly connected to a WiFi router for the primary LED lighting device to access internet.

The WiFi module communicates with the Zigbee module in the primary LED lighting device via a communication interface. The communication interface includes at least one of an I2C (inter-integrated circuit) interface, a UART (universal asynchronous receiver/transmitter) interface, an SPI (system packet interface) interface, and a USB (universal serial bus) interface.

The primary LED lighting device further includes a power supply module, and a light emitting module connected to the power supply module to provide lighting of the primary LED lighting device.

In Step 404, at least one secondary LED lighting device is configured to each include a Zigbee module. The Zigbee modules from each of the primary LED lighting device and the at least one secondary LED lighting device form a Zigbee network, and the Zigbee modules in the Zigbee network are wirelessly connected.

The at least one secondary LED lighting device further includes a power supply module, and a light emitting module connected to the power supply module to provide lighting of the at least one secondary LED lighting device.

In Step 406, a smart terminal is configured to control lighting of the at least one secondary LED lighting device via the primary LED lighting device.

The smart terminal is configured to send control instructions to the primary LED lighting device via the WiFi router, and wherein the control instructions are further transmitted from the primary LED lighting device to each of the at least one secondary LED lighting device in the Zigbee network to control the lighting thereof.

Alternatively, the smart terminal is directly connected to the WiFi module of the primary LED lighting device to send control instructions to each of the at least one secondary LED lighting device in the Zigbee network to control the lighting thereof.

The smart terminal is configured to send control instructions including a switching instruction, a luminance control instruction, and a combination thereof. The smart terminal includes one of a mobile phone, a tablet PC, a desktop computer, a notebook, and a cloud server.

In this manner, the disclosed LED lighting apparatus, control systems, and methods do not include conventionally-used Zigbee-containing gateway. System cost can then be reduced. In addition, the LED lighting control system is easy to operate at the user end. For example, various LED lighting devices, including a primary LED lighting device and secondary LED lighting device(s), can be configured in different places of a public, commercial, and/or indoor environment. By using a smart terminal, e.g., a smart phone, the lighting of each LED lighting device in those different places can be controlled using the disclosed LED lighting apparatus and control systems.

Further, there is no need to configure a WiFi module in each LED lighting device and the WiFi module can only be configured in the primary LED lighting device to control lighting of the each LED lighting device. System power consumption is therefore reduced and system cost is also reduced. Furthermore, a large number of LED lighting devices/nodes can be included to form the Zigbee network, while a smart terminal (such as a smart phone or a computer) can remotely control these large number of LED lighting devices through internet, without using conventional home gateway and/or conventional wireless coordinator.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Apparatus and control systems for LED lighting, and methods for configuring the control systems are provided. An LED lighting apparatus includes: a primary LED lighting device containing a WiFi module and a Zigbee module; and at least one secondary LED lighting device containing a Zigbee module. An LED lighting control system includes an LED lighting apparatus, a WiFi router, and a smart terminal for controlling lighting of the LED lighting apparatus. A Zigbee network is formed by Zigbee modules included in the primary/secondary LED lighting devices. The WiFi module of the primary LED lighting device is connected to internet via the WiFi router.

The disclosed LED lighting apparatus, control systems, and methods do not include conventionally-used Zigbee-containing gateway. System cost can then be reduced. In addition, the LED lighting control system is easy to operate at the user end. For example, various LED lighting devices, including a primary LED lighting device and secondary LED lighting device(s), can be configured in different places of a public, commercial, and/or indoor environment. By using a smart terminal, e.g., a smart phone, the lighting of each LED lighting device in those different places can be controlled using the disclosed LED lighting apparatus and control systems.

Further, there is no need to configure a WiFi module in each LED lighting device and the WiFi module can only be configured in the primary LED lighting device to control lighting of each LED lighting device in the control system. System power consumption is therefore reduced and system cost is also reduced. Furthermore, a large number of LED lighting devices/nodes can be included to form a Zigbee network, while a smart terminal (such as a smart phone or a computer) can remotely control those large number of LED lighting devices through internet, without using conventional home gateway and/or conventional wireless coordinator.

REFERENCE SIGN LIST

LED lighting apparatus 100
Primary LED lighting device 1
Secondary LED lighting device 2
WiFi module 12
Zigbee module 13
Power supply module 15
Light emitting module 17
Zigbee module 23
Power supply module 25
Light emitting module 27
LED lighting control system 300
WiFi router 3
Smart terminal 4

What is claimed is:

1. An LED lighting apparatus, comprising:
a primary LED lighting device and
at least one secondary LED lighting device, wherein:
the primary LED lighting device includes a WiFi module and a Zigbee module;
the at least one secondary LED lighting device includes a Zigbee module;
the Zigbee modules from the primary LED lighting device and the at least one secondary LED lighting device form a Zigbee network;
the Zigbee modules in the Zigbee network are wirelessly connected;
the LED lighting apparatus does not include a separate Zigbee-containing gateway;
the primary LED lighting device and the at least one secondary LED lighting device are wirelessly connected by the Zigbee modules from each of the primary LED lighting device and the at least one secondary LED lighting device;
the primary LED lighting device is the only device including the WiFi module;
the WiFi module communicates with the Zigbee module in the primary LED lighting device via a communication interface within the primary LED lighting device;
a smart terminal controls lighting of the at least one secondary LED lighting device via the primary LED lighting device; and
control instructions from the smart terminal are transmitted to the WiFi module of the primary LED lighting device, and are further sent to one or more of the at least one secondary LED lighting devices in the Zigbee network from the primary LED lighting device.

2. The apparatus according to claim 1, wherein the WiFi module communicates with the Zigbee module in the primary LED lighting device via a communication interface, the communication interface including at least one of an I2C (inter-integrated circuit) interface, a UART (universal asynchronous receiver/transmitter) interface, an SPI (system packet interface) interface, and a USB (universal serial bus) interface.

3. The apparatus according to claim 1, wherein the primary LED lighting device further includes a power supply module, and a light emitting module connected to the power supply module to provide lighting of the primary LED lighting device.

4. The apparatus according to claim 1, wherein the at least one secondary LED lighting device further includes a power supply module, and a light emitting module connected to the power supply module to provide lighting of the at least one secondary LED lighting device.

5. An LED lighting control system, comprising:
a primary LED lighting device, at least one secondary LED lighting device, a WiFi router, and a smart terminal, wherein:
the primary LED lighting device includes a WiFi module and a Zigbee module, the WiFi module being wirelessly connected to the WiFi router for the primary LED lighting device to access internet;
the at least one secondary LED lighting device includes a Zigbee module;
the Zigbee modules from each of the primary LED lighting device and the at least one secondary LED lighting device form a Zigbee network;
the Zigbee modules in the Zigbee network are wirelessly connected;
the LED lighting control system does not include a separate Zigbee-containing gateway;
the primary LED lighting device is the only device including the WiFi module;
the WiFi module communicates with the Zigbee module in the primary LED lighting device via a communication interface within the primary LED lighting device;
the smart terminal is configured to control lighting of the at least one secondary LED lighting device via the primary LED lighting device; and
control instructions from the smart terminal are transmitted to the WiFi module of the primary LED lighting device, and are further sent to one or more of the at least one secondary LED lighting devices in the Zigbee network from the primary LED lighting device.

6. The system according to claim 5, wherein the smart terminal is configured to send control instructions to the primary LED lighting device via the WiFi router, and wherein the control instructions are further transmitted from the primary LED lighting device to each of the at least one secondary LED lighting device in the Zigbee network to control the lighting thereof.

7. The system according to claim 5, wherein the smart terminal is directly connected to the WiFi module of the primary LED lighting device to send control instructions to each of the at least one secondary LED lighting device in the Zigbee network to control the lighting thereof.

8. The system according to claim 5, wherein the smart terminal is configured to send control instructions including a switching instruction, a luminance control instruction, and a combination thereof.

9. The system according to claim 5, wherein the WiFi module communicates with the Zigbee module in the primary LED lighting device via a communication interface, the communication interface including at least one of an I2C (inter-integrated circuit) interface, a UART (universal asynchronous receiver/transmitter) interface, an SPI (system packet interface) interface, and a USB (universal serial bus) interface.

10. The system according to claim 5, wherein the primary LED lighting device further includes a power supply module, and a light emitting module connected to the power supply module to provide lighting of the primary LED lighting device.

11. The system according to claim 5, wherein the at least one secondary LED lighting device further includes a power supply module, and a light emitting module connected to the power supply module to provide lighting of the at least one secondary LED lighting device.

12. The system according to claim 5, wherein the smart terminal includes one of a mobile phone, a tablet PC, a desktop computer, and a notebook.

13. The system according to claim 5, wherein the smart terminal includes a server including a cloud server.

14. A method for configuring an LED lighting control system, comprising:
   configuring a primary LED lighting device each including a WiFi module and a Zigbee module, wherein the WiFi module is wirelessly connected to a WiFi router for the primary LED lighting device to access internet;
   configuring at least one secondary LED lighting device including a Zigbee module, wherein the Zigbee modules from each of the primary LED lighting device and the at least one secondary LED lighting device form a Zigbee network, and the Zigbee modules in the Zigbee network are wirelessly connected; and
   configuring a smart terminal to control lighting of the at least one secondary LED lighting device via the primary LED lighting device;
   wherein:
      the method does not include configuring a separate Zigbee-containing gateway;
      the primary LED lighting device is the only device including the WiFi module;
      the WiFi module communicates with the Zigbee module in the primary LED lighting device via a communication interface within the primary LED lighting device; and
      control instructions from the smart terminal are transmitted to the WiFi module of the primary LED lighting device, and are further sent to one or more of the at least one secondary LED lighting devices in the Zigbee network from the primary LED lighting device.

15. The method according to claim 14, wherein the smart terminal is configured to send control instructions to the primary LED lighting device via the WiFi router, and wherein the control instructions are further transmitted from the primary LED lighting device to each of the at least one secondary LED lighting device in the Zigbee network to control the lighting thereof.

16. The method according to claim 14, wherein the smart terminal is directly connected to the WiFi module of the primary LED lighting device to send control instructions to each of the at least one secondary LED lighting device in the Zigbee network to control the lighting thereof.

17. The method according to claim 14, wherein the smart terminal is configured to send control instructions including a switching instruction, a luminance control instruction, and a combination thereof.

18. The method according to claim 14, wherein the WiFi module communicates with the Zigbee module in the primary LED lighting device via a communication interface, the communication interface including at least one of an I2C (inter-integrated circuit) interface, a UART (universal asynchronous receiver/transmitter) interface, an SPI (system packet interface) interface, and a USB (universal serial bus) interface.

19. The method according to claim 14, wherein the smart terminal includes one of a mobile phone, a tablet PC, a desktop computer, a notebook, and a cloud server.

\* \* \* \* \*